US012701379B2

(12) United States Patent
Baumgarte et al.

(10) Patent No.: US 12,701,379 B2
(45) Date of Patent: Aug. 4, 2026

(54) AUDIO SCENE DESCRIPTION AND CONTROL

(71) Applicant: Apple Inc., Cupertino, CA (US)

(72) Inventors: Frank Baumgarte, Sunnyvale, CA (US); Moo Young Kim, San Diego, CA (US); Dipanjan Sen, Dublin, CA (US); Sang Uk Ryu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 476 days.

(21) Appl. No.: 18/109,722

(22) Filed: Feb. 14, 2023

(65) Prior Publication Data

US 2023/0283977 A1 Sep. 7, 2023

Related U.S. Application Data

(60) Provisional application No. 63/316,323, filed on Mar. 3, 2022.

(51) Int. Cl.
*H04S 7/00* (2006.01)
*G06F 3/16* (2006.01)
*G10L 19/008* (2013.01)

(52) U.S. Cl.
CPC .............. *H04S 7/302* (2013.01); *G06F 3/165* (2013.01); *G10L 19/008* (2013.01); *H04S 2400/01* (2013.01)

(58) Field of Classification Search
CPC ...... H04S 7/302; H04S 2400/01; G06F 3/165; G10L 19/008
See application file for complete search history.

(56) References Cited

U.S. PATENT DOCUMENTS

| | | | | |
|---|---|---|---|---|
| 2007/0165139 A1* | 7/2007 | Eleftheriadis | ........ | H04N 21/426 348/E5.002 |
| 2019/0052917 A1 | 2/2019 | Brondijk et al. | | |
| 2021/0056978 A1 | 2/2021 | Mehta et al. | | |

FOREIGN PATENT DOCUMENTS

| | | |
|---|---|---|
| CN | 112602053 A | 4/2021 |
| WO | 2020043539 A1 | 3/2020 |

OTHER PUBLICATIONS

Pike, C., et al., "Object-based spatial audio production for virtual reality using the Audio Definition Model," Research & Development White Paper, WHP 378, Design & Engineering, British Broadcasting Corporation, Oct. 2016, 13 pages.

(Continued)

*Primary Examiner* — Joseph Saunders, Jr.
(74) *Attorney, Agent, or Firm* — Aikin & Gallant, LLP

(57) ABSTRACT

A data structure stored in memory includes a scene description that defines a hierarchy of scene components that are in digital audio content received from a producer. The hierarchy has several stages including a fourth stage in which a scene composition is defined that contains all scene components needed to render the digital audio content in a single presentation, for instance as intended by the producer, and for input to a spatial audio renderer, wherein the scene composition contains one or more composition selection groups. Other aspects are also described and claimed.

21 Claims, 7 Drawing Sheets

Hierarchy of scene description in AudioScenes().

(56)         References Cited

OTHER PUBLICATIONS

"Information technology—High efficiency coding and media delivery in heterogeneous environments—Part 3: 3D Audio," International Standard ISO/IEC 23008-3, Second edition, Feb. 2019, 812 pages.
"Recommendation ITU-R BS.2076-2, Audio definition model," BS Series Broadcasting service (sound), International Telecommunications Union, Oct. 2019, 115 pages.

* cited by examiner

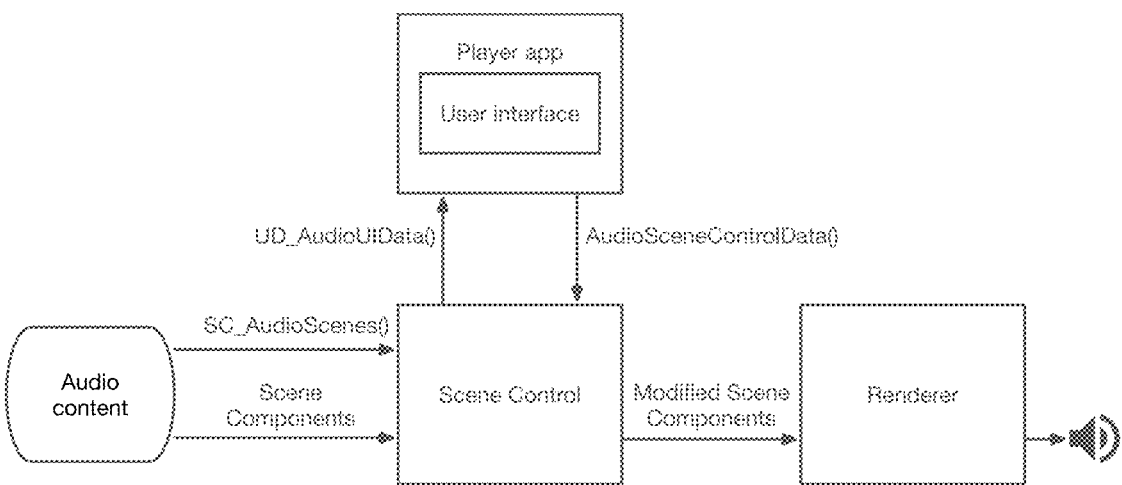

Fig. 1 Example playback system with scene control.

Scene description

Scene with all its parts

Grouping into categories
(optional)

Compose scene

CompositionSelectionGroup can be
manipulated by user

Group mutually exclusive items together

Group same items
with alternative languages

Remaining
Items

Group into "items",
separate non-language items

Audio scene components
(Defined in global codec configuration)

Example: 1 Object or 1 HOA

Fig. 2 Hierarchy of scene description in AudioScenes().

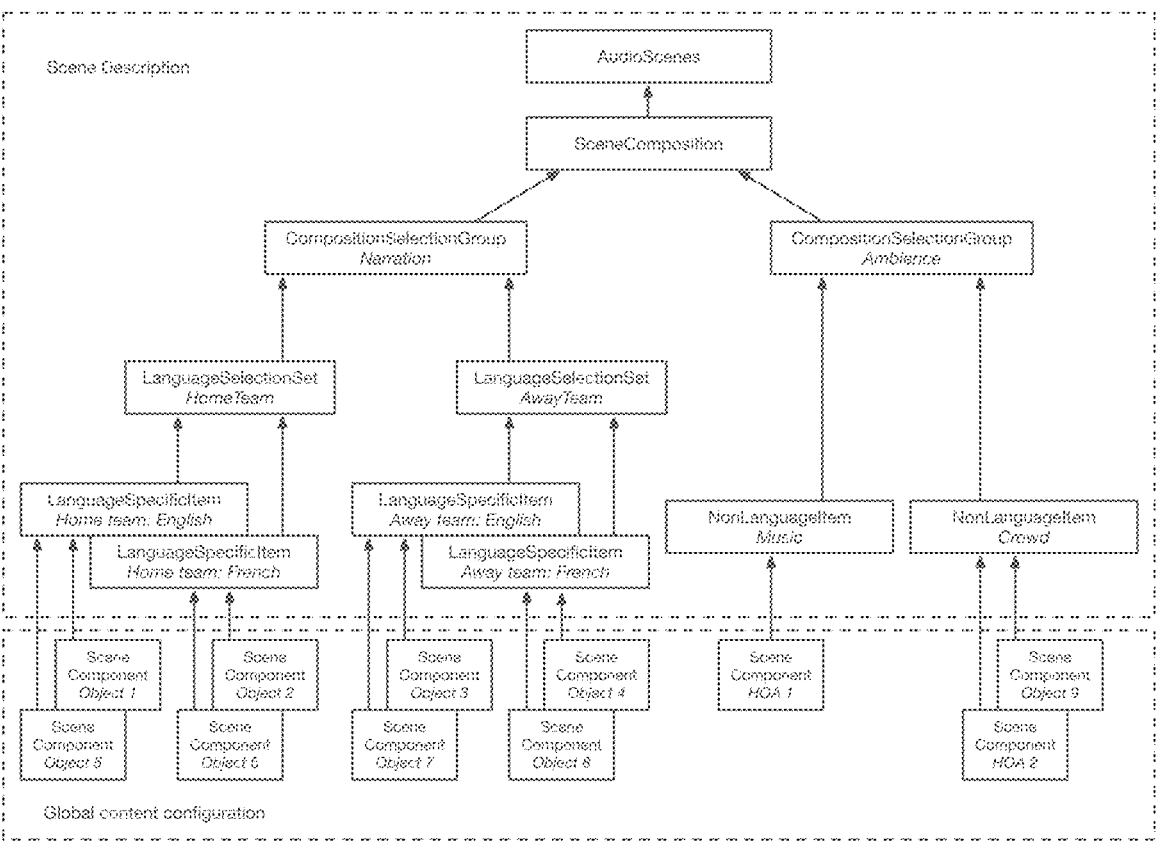
Fig. 3 Example audio scene description structure for sports content.

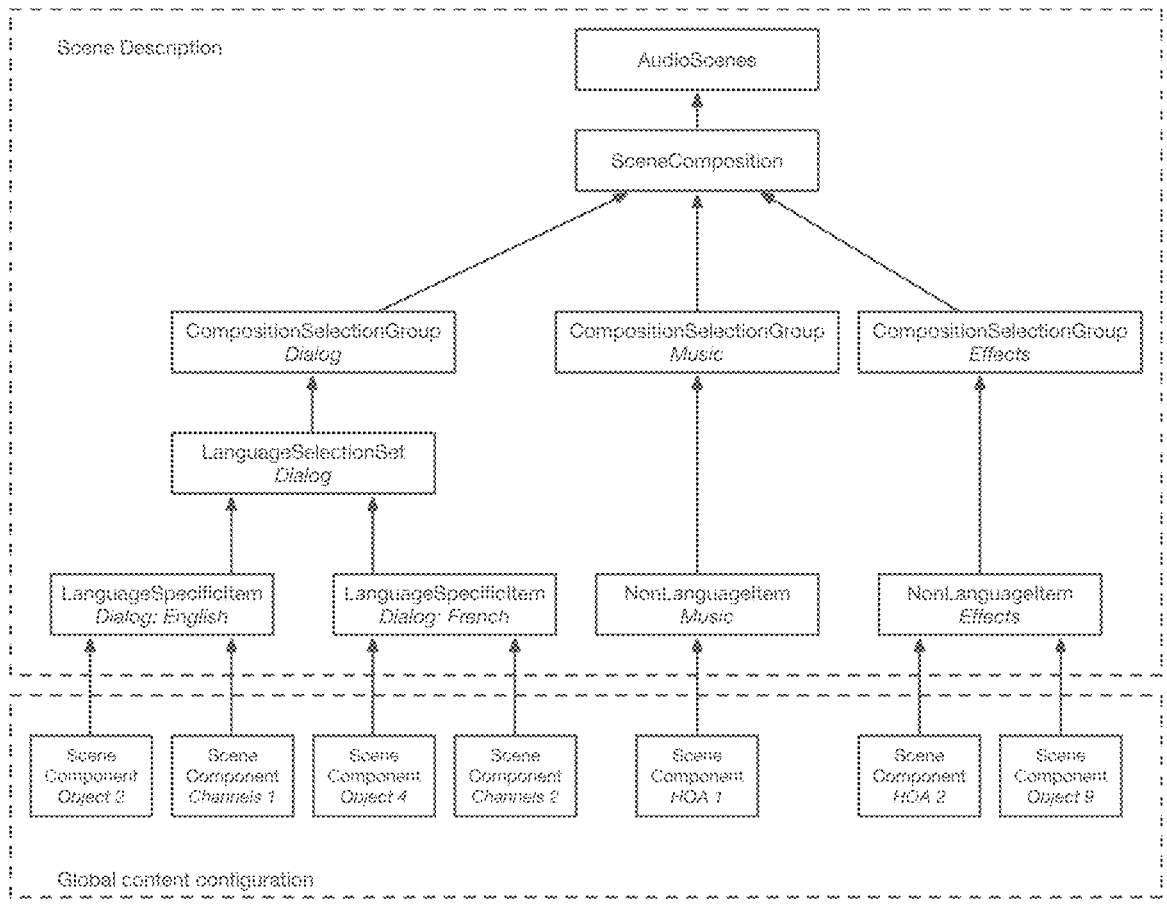
Fig. 4 Example audio scene description structure for a movie.

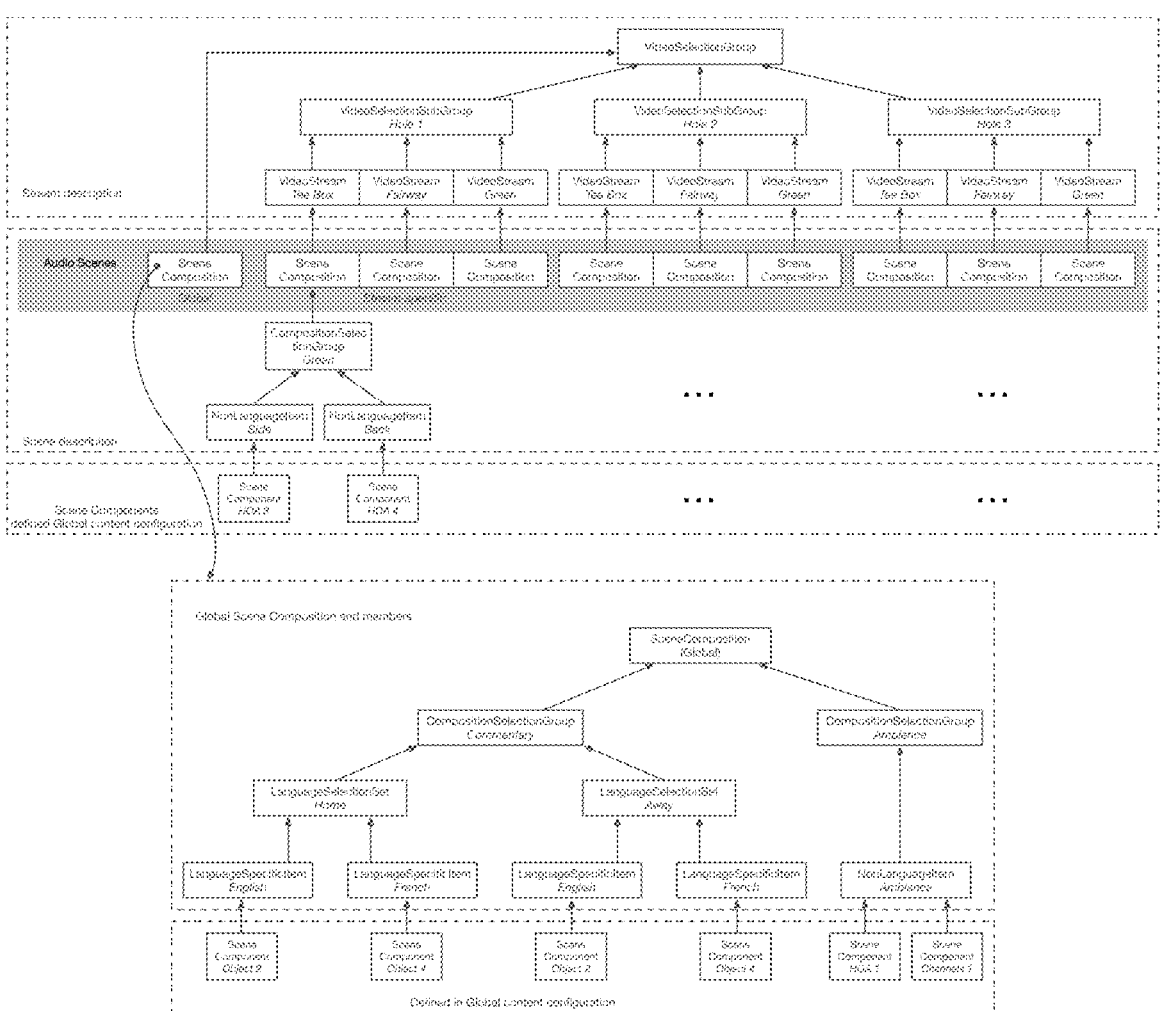
Fig. 5 Example audio scene descriptions for multi-stream golf tournament content.

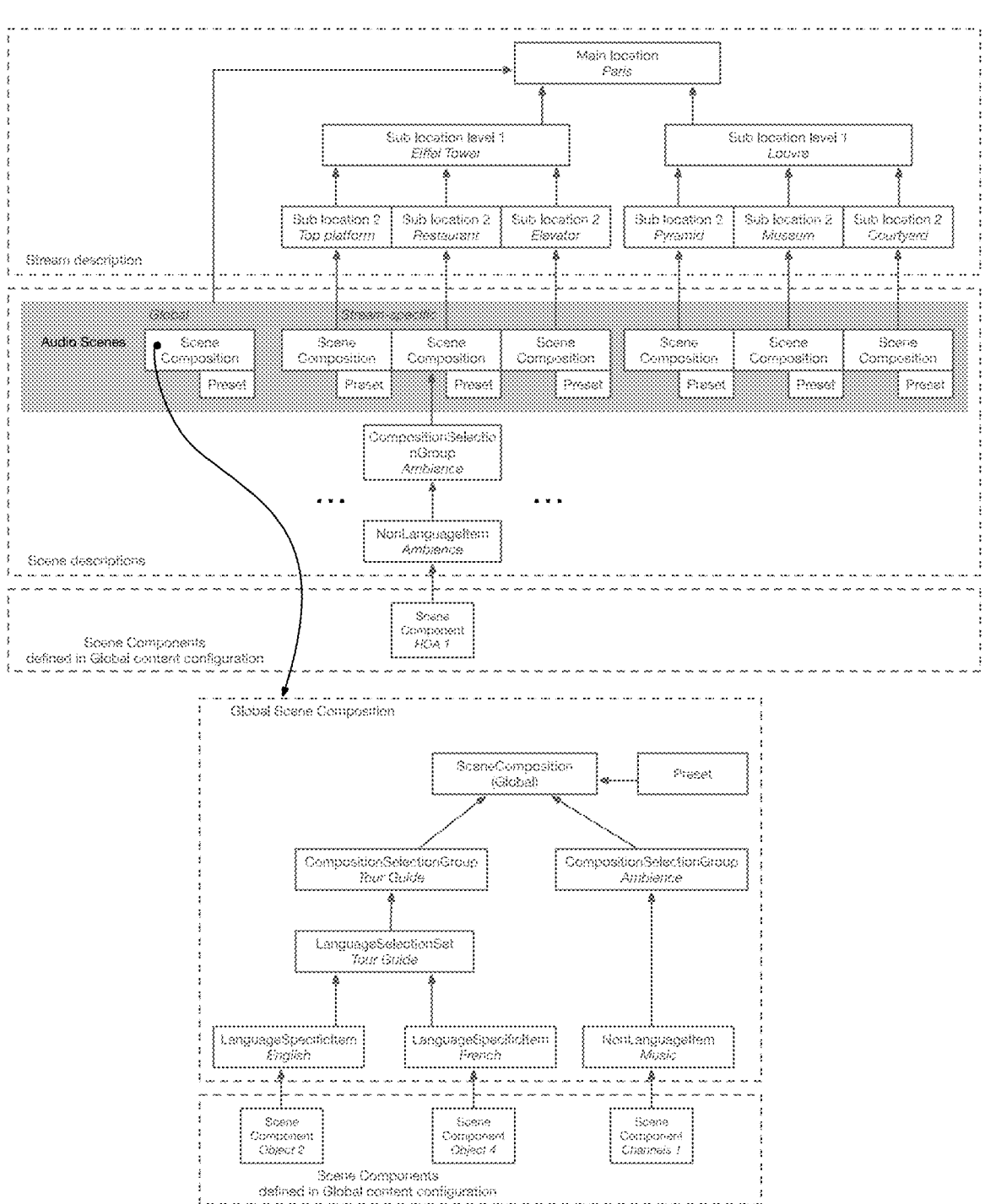
Fig. 6 Example audio scene descriptions for a VR city tour.

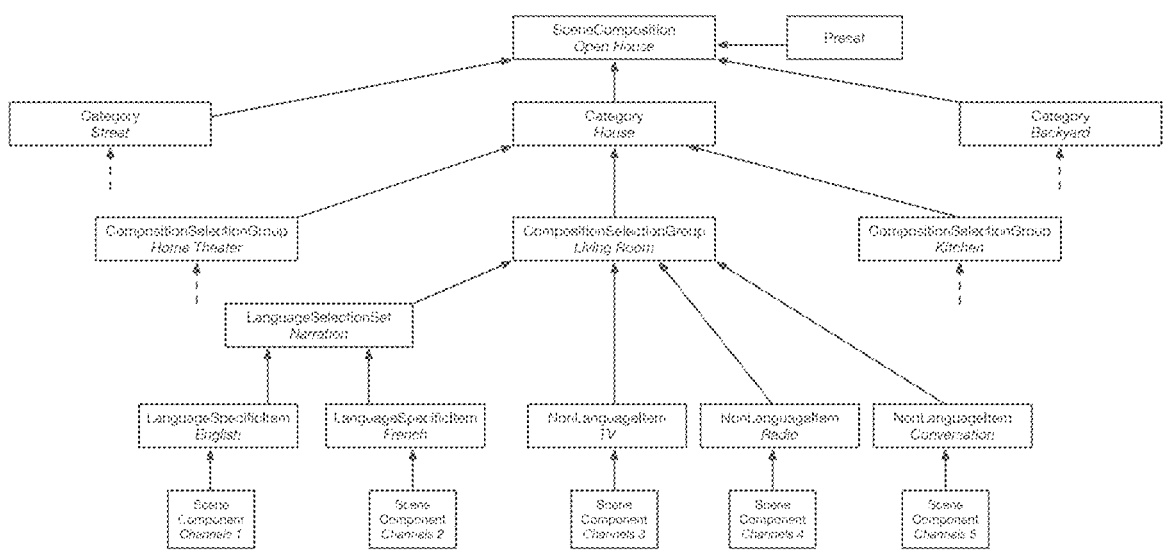
Fig. 7 Example audio scene description for a VR Open House visit.
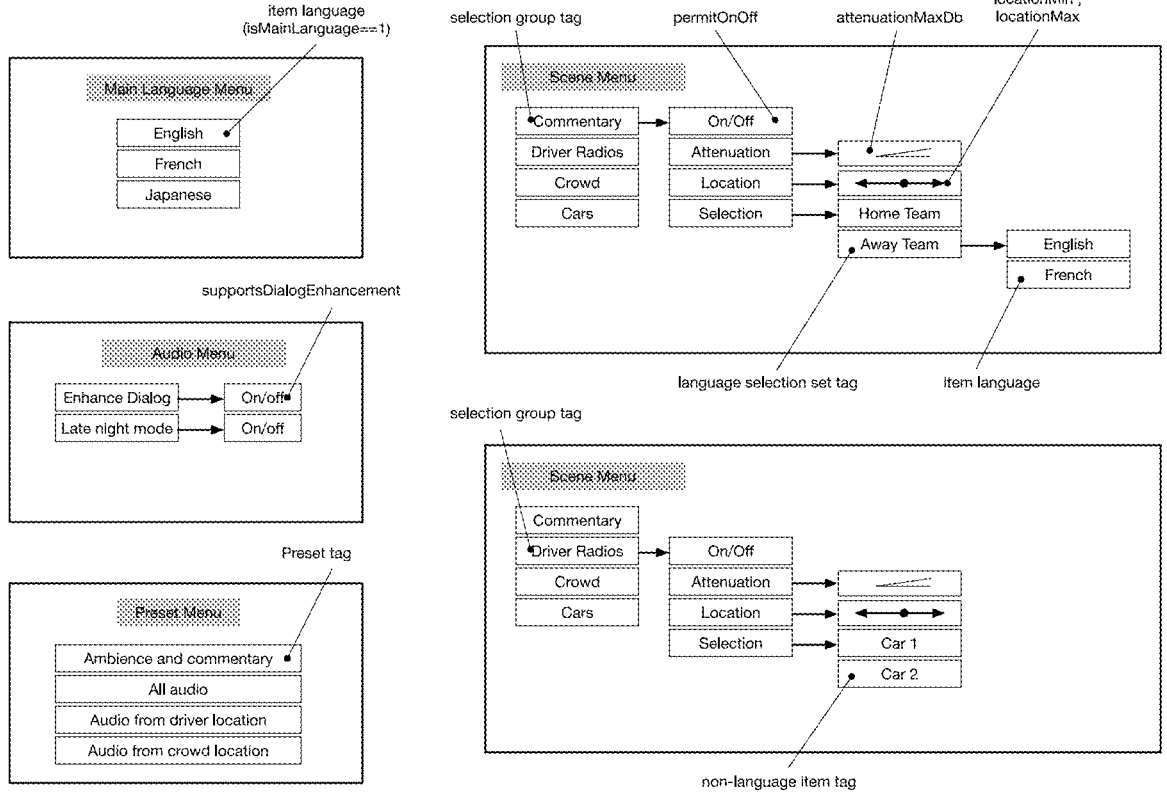
Fig. 8 Example user interface menus.

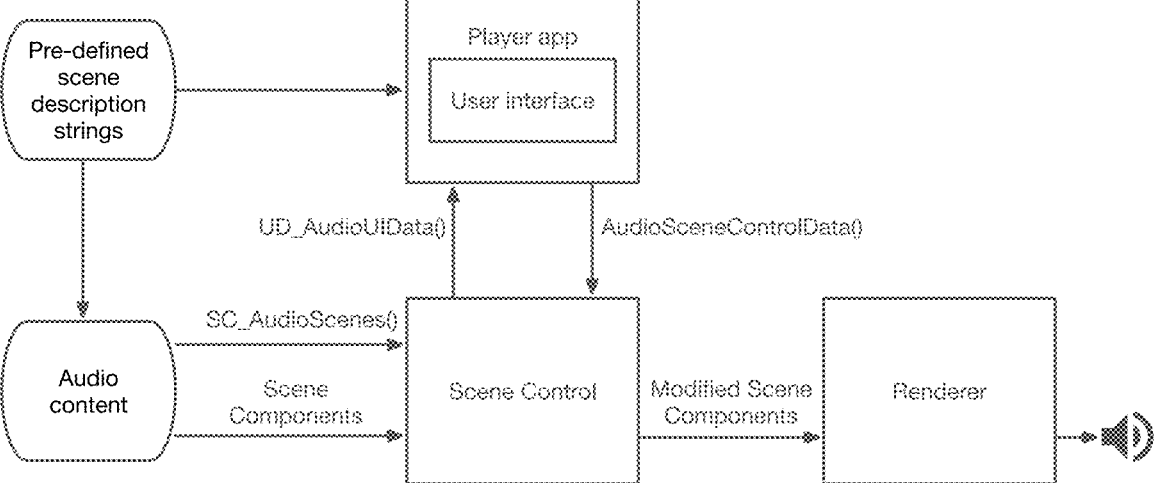
Fig. 9 Use of a table of pre-defined scene description strings (or tags) to insert indices into the scene description and to enable the user interface to look up the tags.

AUDIO SCENE DESCRIPTION AND CONTROL

RELATED APPLICATION

This patent application claims the benefit of the earlier filing date of U.S. provisional application No. 63/316,323 filed 3 Mar. 2022.

FIELD

One aspect of this disclosure is a digital electronic scene controller that enables an application program or a user of the application program to customize how an audio program is rendered for spatial audio playback. Other aspects are also described.

BACKGROUND

Spatial sound systems deliver an enhanced sound experience relative to current widespread 5.1 channel audio programs and playback systems. Spatial sound systems benefit from high quality audio coding and error-free transmission so that the timbre, sound localization and sound envelopment of the original audio program can be experienced by a user (listener) of the playback system. Presentation of spatial sound over headphones is also possible using a binaural renderer.

SUMMARY

In one aspect, a method for processing digital audio content for input to a spatial audio renderer includes the following operations. Digital audio content is received from a producer, wherein the digital audio content has a number of scene components and a scene description. The scene description defines a hierarchy of the scene components, as several stages. In a first stage, each scene component is assigned to be a member of either a language-specific item or a non-language item, but not both. These items represent groups of scene components. There is at least one item, a language-specific item or a non-language item, at the first stage. There can be multiple language-specific items and non-language items at the first stage.

In a second stage, all of the language-specific items are members of one but not necessarily the same language selection set, there being one or more language selection sets. In a third stage, one or more of the language selection sets are grouped into a composition selection group, and one or more of the non-language items are grouped into the same or another composition selection group, wherein of all items that are in a single composition selection group no more than one is active at a time. In a fourth stage, a scene composition is defined that contains all scene components needed to render the digital audio content in a single presentation, as intended by the producer and for input to a spatial audio renderer. The scene composition contains one or more of the composition selection groups. At least some of the scene components is then modified in accordance with the scene description and in accordance with user input to produce modified scene components for input to the spatial audio renderer.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings, in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 1 shows an example playback system with scene control.

FIG. 2 depicts an example of a hierarchy of the scene components as defined in the scene description.

FIG. 3 is a block diagram illustrating an example of the scene description hierarchy for sports content.

FIG. 4 illustrates an example of the scene description hierarchy for a movie.

FIG. 5 shows an example multi-stream scene description for an example multimedia content being a golf tournament.

FIG. 6 is an example audio scene description for multi-stream golf tournament content.

FIG. 7 is an example audio scene description for a VR Open House visit.

FIG. 8 shows menus in an example user interface.

FIG. 9 is a block diagram of the playback system configured to use a table of pre-defined scene description strings (or tags).

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

In one aspect, this disclosure relates to multimedia authoring software that can be used by a producer to create a data structure package of multimedia content (e.g., an audio visual work containing an audio program) in a way that the audio program can be exposed to a user (e.g., a consumer) in different ways, to suit the different interests of myriad users. For example, if the multimedia content is a recording of a sports event, then the user would want to listen to a main soundtrack of the audio program but may or may not want to listen to a particular commentary track. In such cases, a goal of the software is to produce a package that allows each user to turn on and turn off the commentary, during playback of the recording. The software achieves such user interaction by producing a package that includes not just the audio recording but also associated metadata having a special format. The software enables the producer of the content, e.g., a sports event broadcaster, to specify various parameters within the metadata, for instance whether or not there is a commentary track (in addition to a main sound track)

that can be turned on or turned off by the user. As the content becomes more complex, its associated metadata becomes more extensive in order to give the user control of more aspects during playback (in accordance with the producer's wishes.)

The producer (a term that is used generically here to also refer to a content creator or a content provider or distributor) uses the authoring software to package a recording along with its associated metadata, which package is to be for example transferred over the Internet to another computing device. The other computing device may be a playback device, e.g., a tablet computer, a digital media player or appliance, or a smartphone of a user, in which the audio program is digitally processed to compose an audio scene that is then rendered by a spatial audio renderer into the speaker drivers signals that produce spatial sound. The package, which is said to contain in a logical sense the recording and its metadata, may be transferred as a downloadable file (once the recording has been completed) or it may be transferred as a stream (particularly if the recording is still in process and has not yet been completed.) The metadata may be embedded into the stream or it may be transferred as a separate stream as side information.

The producer may create a sound program which includes the recording and its metadata. The sound program is designed so that its playback can be experienced as spatial sound. This experience may be in accordance with a default desired by the producer, or it may be according to modifications made by a user who is listening to the decoded sound program. The recording contains a number of audio scene components, and the metadata contains a scene description. The scene description provides one or more scene compositions, each of which describes how the various scene components are to be combined to form a respective scene. The respective scene is a complete arrangement of all scene components for one particular playback experience (of the sound program), which is obtained when the scene is input to the spatial audio renderer.

One aspect of the disclosure here is a data structure format for the producer-specified scene description, which has a hierarchy for how the scene components are to be modified in accordance with a user's wishes (which are provided through a user interface.)

Another aspect is a decoder-side process or controller referred to as scene control, that receives the sound program (containing the scene components and the associated scene description), and produces the scene for input to the spatial audio renderer.

The sound program (also referred to here as the audio content) is composed of various audio scene components that are to be rendered for presentation to a user. For example, such scene components could be any combination of mono or multi-channel signals, audio objects, and Ambisonics.

The scene description defines which scene components will be presented to the user, and which will not be. The scene description can also include various tags for groups of scene components to identify logical elements of the scene at different levels of detail. The scene description is provided as metadata for a number of audio scene components, by an encoder-side process (also referred to here as being producer-specified metadata.) The scene description enables real-time control of how an audio scene is composed by a decoder-side process or digital controller, referred to as scene control. The scene control may be performed by or may be a hardware part of a playback system. A high-level block diagram of an example playback system with scene control is shown in FIG. 1.

Referring to FIG. 1, a digital media player application program (player app) is executed by a processor of the system, and thus is used by a user such as a consumer to interact with a scene control. The scene control, to be described in detail below, is a digital electronic controller, e.g., software being executed by a processor of the system, that enables the user to customize how audio content (a sound program) is reproduced as sound by several speakers (sound transducers.) To do so, the scene control generates modified audio scene components (modified according to user input) which are input to a spatial audio renderer. The spatial audio renderer (software being executed by a processor of the system) converts the modified audio scene components into speaker driver signals to drive the speakers, resulting in spatial sound being reproduced. The speakers may be a stereo pair of loudspeakers, a set of surround sound speakers, or left and right earphones of a headset.

The audio content is provided by the output of a decoder (not shown.) The decoder, which may be software executed by a processor of the playback system, undoes various forms of encoding within a received bitstream, which encoding was intended to for example reduce the bit rate of the audio content. Such encoding is useful when the audio content is being transferred over the Internet from an encoder side to the decoder side in the playback system of a user. The encoder side may, for example, be performed by a server of a producer.

The audio content contains scene components, and a screen description that is referred to here as AudioScenes( ), to be described further below. A scene component may include an audio signal or a sound field representation such as in an Ambisonics format. A scene component may be associated with (as part of the producer specified or encoder side generated metadata) a spatial descriptor that is useful for the renderer to apply when rendering the scene component. For example, for a scene component which is an audio object, the spatial descriptor associated with the object may indicate where the object is rendered in the scene. A spatial descriptor may, in a logical sense, be considered to be part of the individual scene component with which it is associated, or it may be part of the scene description.

The scene control (or scene controller) performs real-time control in the decoder-side, according to the scene description.) In one aspect, the scene control takes as input the scene components provided by the encoder-side process, and generates "modified scene components" solely based on the producer specified scene description. The modified scene components are the audio elements that make up an audio scene and that are provided to the audio renderer. A scene is a combination of the audio content's scene components that have been combined (to form the scene) either according to the producer-specified scene description, or if desired modified in accordance with the user's selections made via a user interface. Moreover, the producer-specified scene description may define which scene components can be modified by the user (and perhaps also which ones cannot) and the permitted range of the modifications, if applicable.

The scene control's composition of the audio scene may be driven by modifications that are requested through a user interface. The user interface may be integrated into a media player app. The user interface exposes the permitted controls to the user, for modifying a default or producer-specified audio scene. The controls are defined in metadata that is provided by the scene control to the user interface. This metadata is referred to here as user interface-targeted metadata, and is generated by the scene controller based on the information in AudioScenes( ). For example, the scene controller extracts one or more parts of the scene description from the producer-specified AudioScenes( ) and forwards such extracted scene description, labeled AudioUIData( ) in the figures, to the user interface.

The user interface presents options to a user (e.g., a consumer) in accordance with the user interface targeted metadata. Such options include the option to select a language from several available languages, or turn optional audio components on or off, or select a preset, for example. To enable such user interaction, payloads in the producer specified metadata are defined that carry, in addition to the scene description therein, a "for user interface" flag (forUI flag.) The forUI flag, when set, instructs the scene control to drive the user interface with information that the scene control extracts form the producer-specified metadata.

When the forUI flag is set, this also instructs the scene control to expect a request for changes to arrive from the user interface, referred to here as "user input". In accordance with this request, the scene control will modify the scene components it provides to the renderer. In other words, the scene controller applies modifications when forming the scene, as given by the user input through AudioSceneControlData( ). For example, the scene controller can mute scene components, change their level, select one of several different language versions of a scene component, or change the rendering location of a scene component, based on the user input. The resulting modified scene components are then provided as input to the renderer.

Scene Description

The scene description that arrives in the AudioScenes( ) format is generated by an encoder side process (not shown), such as one that is generating the sound program as a whole. By generating and providing the scene description as metadata, the producer is able to dictate how one or more alternative scenes are composed or put together by the scene control when presented to the user as playback.

One example of the scene description as defined by the AudioScenes( ) syntax is given in Table 1. The scene description may have a hierarchy such as the one shown in FIG. 2. At the bottom of that figure, it can be seen that the audio content contains one or more audio scene components. A scene component is an elementary piece of audio content that cannot be divided into smaller pieces when being rendered in a single presentation of the sound program. For example, a multi-channel recording is a single scene component because all of its channels are presented to the listener in a single presentation.

In the first stage of the scene description, scene components are grouped and each group is assigned to either a language-specific item (LanguageSpecificItem) or a non-language item (NonLanguageItem). For example, consider the recording of an English narrator which is represented by a scene component being an audio object. This object is assigned to a language-specific item. In contrast, a recording of a crowd may be given as an Ambisonics signal and two audio objects, in which all three signals are assigned to one NonLanguageItem.

All language-specific items are members of one but not necessarily the same LanguageSelectionSet. From all items in one LanguageSelectionSet, not more than one can be active at a time. A LanguageSelectionSet may contain the same piece of content but in different languages. This allows the user to choose the preferred language for a given piece of content, from a single LanguageSelectionSet in which various language versions of the given piece of content have been grouped.

At the next stage, language selection sets and non-language items are grouped into CompositionSelectionGroups. From the members of such a group, not more than one can be active. For example, if there is a Home Team commentary and an Away Team commentary, only one of them can be active if they are members of the same CompositionSelectionGroup.

Several composition selection groups may be grouped into a single category, and there may be one or more categories in the hierarchy. In one aspect, a single composition selection group cannot be a member of more than one category. Categories can be used for complex scenes to help the user navigate the audio scene of the content. Categories have an option to enforce that not more than one member of a category can be active at the same time.

A scene composition (SceneComposition) refers to all scene components that are needed to render the content as intended by the producer. A SceneComposition contains one or more CompositionSelectionGroups, which may be organized in categories as explained above. Since the content may support more than one useful way of composing it into a scene, there can be several scene compositions for presentation of a particular sound program. In one aspect, all scene compositions of the sound program are gathered in a single scene description (AudioScenes.)

The scene description may also contain presets. Each preset is a set of parameters that determine the selection where multiple alternative members are present. Preset parameters also control modifications, such as attenuation or positioning of objects in the scene. What is controlled by a preset is very similar to what a user is able to control based on the user interface.

To illustrate how the scene description can be used, some examples are given below. For sports content, the scene description structure may, for example, be defined as illustrated in FIG. 3. The diagram shows two available languages for the commentary, each for the Home Team and the Away Team. The alternative languages of the Home Team are members of a LanguageSelectionSet for the Home Team. Both LanguageSelectionSets are members of a CompositionSelectionGroup, which means that only one team commentary can be active. The CompositionSelectionGroup for "Ambience" contains the non-language items "Music" and "Crowd". Only one of the two items can be active.

FIG. 4 shows an example scene description for a movie (a film or motion picture, or a television show) with dialog in English and French. The two languages are members of the LanguageSelectionSet for "Dialog" and the set is the only member of a CompositionSelectionGroup. The SceneComposition contains CompositionSelectionGroups for "Dialog", "Music", and 37 Effects.

Multi-Stream Scene Description

Multi-stream multimedia content may be composed of several simultaneous video feeds and their associated audio. The user interface may give the user control over the video feeds, such as selecting one particular feed to be in the foreground of the presentation. This video feed selection can also be considered or relied upon by the scene control, when composing the audio scene composition. For example, the audio SceneComposition associated with a video feed may be automatically selected by the scene control whenever the video feed is in the foreground.

FIG. 5 shows an example multi-stream scene description for an example multimedia content being a golf tournament.

There are camera feeds from various locations of the golf course, such as the "Tee Box" at "Hole 1". Each camera feed has an associated scene description (SceneComposition). For example, for the first video stream, the SceneComposition contains two scene components which are HOA (Higher-order Ambisonics) signals. The SceneComposition associated with a video stream are called "stream-specific". In addition, there is a global SceneComposition for audio that is common to all streams. For example, such a global SceneComposition is shown in the lower part of FIG. 5 with commentary in English or French and Ambience. In this example, the global SceneComposition is always active and in addition the stream-specific SceneComposition associated with the foreground video is active.

An audio scene description for virtual reality, VR, content can be organized in a similar way. The example in FIG. 6 shows scene descriptions for a VR city tour. The user can visit (virtually of course) different locations in the city and there is an audio SceneComposition associated with each location that is selected for playback automatically as the user enters the respective location. The global SceneComposition (which remains active as the user moves between locations) contains the narration of the tour guide (choice of English or French) and music.

Another VR example is shown in FIG. 7 for an Open House or real property visit. In this example, only one SceneComposition is used, and it contains the audio for all locations; it remains selected or active as the user moves (virtually) between different locations. This arrangement has the advantage that scene components can gradually move in and out of the scene as the user walks from one location of the real property to the next location.

In one aspect of the disclosure here, a purpose of the scene description is to provide control to the user such as which sound sources are active and what languages are chosen, but the scene description does not enable user control of the spatial audio rendering of the sound sources according to the user's location and head orientation in the VR scene, except for headlock mode where a virtual reality screen follows the user's head location and orientation.

Scene Control

The audio scene description facilitates efficient control of the audio scene. The audio scene description defines how the scene is presented to the listener and what aspects of it can be modified. When content is played back without user input, the scene control delivers modified scene components to the renderer that are part of a default scene. The default scene is defined by the settings of a first preset in the scene description. The first preset may specify the main language to be the original language of the content when the content was first produced (if available), or the first preset may specify the main language to be the one with which the user has chosen to interact with the player app or the playback system, or the main language may be specified to be the first language that appears in the language selection set.

The player app that is used to interact with the user for content playback can expose the scene controls to the user. For example, the player app may generate a user interface for various controls as shown in FIG. 8. The scene description defines which controls are permitted and what ranges are allowed. For example, if attenuation is permitted, the maximum allowed attenuation can be specified. Presets are useful here because the user can start with one click on a preset which results in a complete scene being set up and then the user may decide to modify the scene (tune it to their liking)—see FIG. 8. This is especially useful for particular content types such as sports events and perhaps reality tv shows where there are several microphones picking up different sound sources at a wide range of loudness.

The user interface is populated by various tags to describe which parts of the scene are affected by the controls. The tags used in the user interface are determined by the scene description. The scene description contains a tag payload that conveys one or more tag indices, rather than the actual text strings that define the tags. The indices point to the actual text string(s) or tags. This association between indices and their tags may be in a pre-defined string table, referred to here as a table of pre-defined scene description strings or tags. The string table is known to the producer and the player app as illustrated in FIG. 9, where the producer performs a lookup in the string table to find and then insert the appropriate indices into the scene description, while the user interface also performs a lookup in the string table to find the associated tags. Therefore, it is not necessary to send the actual strings in the scene description as doing so will consume considerable bandwidth. Multiple versions of the same string table can be available in different languages, respectively, to support localization of the user interface, while the tag indices in the tag payload may be common across different language markets, e.g., the table for a smartphone sold in France would have text strings that are in French rather than in English.

As also shown in FIG. 9, the user interface menus depend on the AudioUIData( ) information. This information may be a subset of the scene description AudioScenes( ) and only contains the data relevant for the user interface. AudioUI-Data( ) may be as specified in Table 1. User input for the scene control is encoded into the AudioSceneControlData( ) format and then sent back to the Scene Control block.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for processing digital audio content for input to a spatial audio renderer, the method comprising:

receiving digital audio content from a producer, wherein the digital audio content comprises a plurality of scene components and a scene description, and the scene description defines a hierarchy of the plurality of scene components, the hierarchy comprising:

a first stage in which each of the plurality of scene components is grouped into either a language-specific item or a non-language item, not both, wherein there is at least two language-specific items or at least two non-language items in the first stage, a second stage in which all language-specific items are members of one but not necessarily a same language selection set, there being one or more language selection sets, a third stage in which one or more of the language selection sets are grouped into a composition selection group, and two or more of the non-language items are grouped into the same composition selection group or another composition selection group, wherein of all items that are in a single composition selection group no more than one is active at a time, and a fourth stage in which a scene composition is defined that contains all of the plurality of scene components needed to render the digital audio content in a single presentation, for input to the spatial audio renderer, wherein the scene composition contains one or more of the composition selection groups; and modifying at least some of the scene components in accordance with the scene description and in accordance with a user input to produce modified scene components for input to the spatial audio renderer.

2. The method of claim 1 further comprising decoding a bitstream to produce the digital audio content, wherein the bitstream was generated by an encoder-side process.

3. The method of claim 1 further comprising the spatial audio renderer rendering the modified scene components into a plurality of speaker driver signals that are to drive a plurality of speakers and thereby produce spatial sound of the digital audio content.

4. The method of claim 1 wherein modifying at least some of the scene components comprises one or more of the following based on the user input:

muting one or more of the scene components;

changing but not muting an audio level of one or more of the scene components;

selecting one of several different language versions of one or more of the scene components; and changing a rendering location of one or more of the scene components.

5. The method of claim 1 wherein each language selection set contains two or more items being different language versions of a scene component, and of all items that are in a single language selection set no more than one is active at a time.

6. The method of claim 1 wherein the scene description defines which scene components are modifiable by a user and which scene components cannot be modified, the method further comprising:

extracting one or more parts of the scene description and forwarding the extracted parts to a user interface, wherein the forwarded extracted parts define controls that the user interface exposes to the user; and receiving the user input from the user interface.

7. The method of claim 6 wherein a further scene composition is defined in the scene description that cannot be modified by user interaction.

8. The method of claim 1 wherein the hierarchy comprises a fifth stage in which one or more composition selection groups are grouped into one or more categories.

9. A memory for storing data for access by an application program being executed by a computer for processing digital audio content for input to a spatial audio renderer, the memory comprising:

a data structure stored in the memory, the data structure including a scene description that defines a hierarchy of a plurality of scene components that are in digital audio content from a producer, the hierarchy comprising:

a first stage in which each of the plurality of scene components is grouped into either a language-specific item or a non-language item, not both, wherein there is at least two language-specific items or at least two non-language items in the first stage, a second stage in which all language-specific items are members of one but not necessarily a same language selection set, there being one or more language selection sets, a third stage in which one or more of the language selection sets are grouped into a composition selection group, and two or more of the non-language items are grouped into the same composition selection group or another composition selection group, wherein of all items that are in a single composition selection group no more than one is active at a time, wherein an item is active when it is to be rendered in a single presentation of the digital audio content, and a fourth stage in which a scene composition is defined that contains all of the plurality of scene components needed to render the digital audio content in the single presentation, for input to the spatial audio renderer, wherein the scene composition contains one or more composition selection groups.

10. The memory of claim 9 wherein each language selection set contains two or more items being different language versions of a scene component, and of all items that are in a single language selection set no more than one is active at a time.

11. The memory of claim 9 wherein the scene description defines which of the plurality of scene components are modifiable by a user and which of the plurality of scene components cannot be modified.

12. The memory of claim 11 wherein upon one of the scene compositions defined in the scene description cannot be modified by user interaction.

13. The memory of claim 9 wherein the hierarchy comprises a fifth stage in which one or more composition selection groups are grouped into one or more categories.

14. The memory of claim 9, wherein the spatial audio renderer is configured to render one or more scene components into a plurality of speaker driver signals that are to drive a plurality of speakers and thereby produce spatial sound of the digital audio content.

15. A playback system for processing digital audio content, the playback system comprising:

a processor; and memory having stored therein instructions that configure the processor to receive digital audio content from a producer, wherein the digital audio content comprises a plurality of scene components and a scene description, and the scene description defines a hierarchy of the plurality of scene components, the hierarchy comprising:

a first stage in which each of the plurality of scene components is grouped into either a language-specific item or a non-language item, not both, wherein there is at least two language-specific items or at least two non-language items in the first stage, a second stage in which all of the language-specific items are members of one but not necessarily a same language selection set, there being one or more language selection sets, a third stage in which one or more of the language selection sets are grouped into a composition selection group, and two or more of the non-language items are grouped into said composition selection group or another composition selection group, wherein of all items that are in a single composition selection group no more than one is active at a time, and a fourth stage in which a scene composition is defined that contains all of the plurality of scene components needed to render the digital audio content in a single presentation, for input to a spatial audio renderer, wherein the scene composition contains one or more of the composition selection groups; and modify at least some of the plurality of scene components in accordance with the scene description and in accordance with a user input to produce modified scene components for input to the spatial audio renderer.

16. The playback system of claim 15 wherein the processor is further configured to decode a bitstream to produce the digital audio content, wherein the bitstream was generated by an encoder-side process.

17. The playback system of claim 16 wherein the processor is further configured as the spatial audio renderer, rendering the modified scene components into a plurality of speaker driver signals that are to drive a plurality of speakers and thereby produce spatial sound of the digital audio content.

18. The playback system of claim 17 wherein the processor modifying at least some of the scene components comprises one or more of the following based on the user input:

muting one or more of the scene components;

changing but not muting an audio level of one or more of the scene components;

selecting one of several different language versions of a scene component; and changing a rendering location of a scene component.

19. The playback system of claim 15, wherein each language selection set contains two or more items being different language versions of a scene component, and of all items that are in a single language selection set no more than one is active at a time.

20. The playback system of claim 15, wherein the scene description defines which scene components are modifiable by a user and which scene components cannot be modified, the memory comprises further instructions to:

extract one or more parts of the scene description and forwarding the extracted parts to a user interface, wherein the forwarded extracted parts define controls that the user interface exposes to the user; and receive the user input from the user interface.

21. The playback system of claim 15, wherein the hierarchy comprises a fifth stage in which one or more composition selection groups are grouped into one or more categories.

* * * * *